US011247586B2

(12) United States Patent
Becker

(10) Patent No.: US 11,247,586 B2
(45) Date of Patent: Feb. 15, 2022

(54) SEAT SUPPORT FRAME OF A MOTOR VEHICLE SEAT COMPRISING A SEAT FRAME AND AN INCLINATION-ADJUSTABLE SEAT SHELL

(71) Applicant: FISHER DYNAMICS GERMANY GMBH, Wuppertal (DE)

(72) Inventor: Hans Burckhard Becker, Solingen (DE)

(73) Assignee: FISHER DYNAMICS GERMANY GMBH, Wuppertal (DE)

( * ) Notice: Subject to any disclaimer, the term of this patent is extended or adjusted under 35 U.S.C. 154(b) by 0 days.

(21) Appl. No.: 16/981,554

(22) PCT Filed: Mar. 11, 2019

(86) PCT No.: PCT/EP2019/055976
§ 371 (c)(1),
(2) Date: Sep. 16, 2020

(87) PCT Pub. No.: WO2019/179805
PCT Pub. Date: Sep. 26, 2019

(65) Prior Publication Data
US 2021/0001756 A1 Jan. 7, 2021

(30) Foreign Application Priority Data
Mar. 21, 2018 (DE) .................. 10 2018 106 611.2

(51) Int. Cl.
*B60N 2/14* (2006.01)
*B60N 2/16* (2006.01)
(Continued)

(52) U.S. Cl.
CPC ......... *B60N 2/1615* (2013.01); *B60N 2/0232* (2013.01); *B60N 2/682* (2013.01); *B60N 2002/0236* (2013.01); *B60N 2205/30* (2013.01)

(58) Field of Classification Search
CPC ........ B60N 2/68; B60N 2/682; B60N 2/1615; B60N 2/0232; B60N 2002/0236; B60N 2205/30
(Continued)

(56) References Cited

U.S. PATENT DOCUMENTS 4,832,408 A * 5/1989 Bertsch ................... B60N 2/68
297/452.36
5,328,248 A * 7/1994 Nishiyama ............ B60N 2/071
297/452.18
(Continued)

FOREIGN PATENT DOCUMENTS

DE 102012103919 A1 4/2013
DE 102013001805 B3 5/2014
DE 202017105365 U1 9/2017

OTHER PUBLICATIONS

International Search Report dated Jun. 11, 2019 re: Application No. PCT/EP2019/055976, pp. 1-2, citing: DE 102012703919 A1 and DE 102013001805 B3.

*Primary Examiner* — Shin H Kim
(74) *Attorney, Agent, or Firm* — Cantor Colburn LLP

(57) ABSTRACT

A seat support frame of a motor vehicle seat includes a seat frame which has left-hand and right-hand side parts, and a transverse tube connecting the two side parts to one another at the front. The seat support frame has a seat shell supported by the seat frame and composed of two sheet metal parts firmly connected to and arranged at a distance from one another, specifically upper and lower shells. The upper and lower shells form a channel running parallel to the transverse tube. The seat support frame includes an adjusting device which, on one side, is connected only, at a front region of one of the side parts and, on the other side, is connected in an articulated manner to the end region of the
(Continued)

channel adjacent to the side part, and allows the distance of the seat shell relative to the transverse tube to be adjusted.

14 Claims, 4 Drawing Sheets

(51) Int. Cl.
*B60N 2/02* (2006.01)
*B60N 2/68* (2006.01)

(58) Field of Classification Search
USPC ..................................................... 297/452.18
See application file for complete search history.

(56) References Cited

U.S. PATENT DOCUMENTS

| | | | | |
|---|---|---|---|---|
| 5,364,167 A * | 11/1994 | Aoki | ............... | B60N 2/686 |
| | | | | 297/452.18 |
| 5,368,368 A * | 11/1994 | Fukui | ............... | B60N 2/00 |
| | | | | 297/452.18 |
| 5,813,727 A * | 9/1998 | Sugawa | ............... | A47C 1/024 |
| | | | | 297/411.42 |
| 6,106,071 A * | 8/2000 | Aebischer | ............... | B60N 2/686 |
| | | | | 297/452.18 |
| 6,739,673 B2 * | 5/2004 | Gupta | ............... | B60N 2/3013 |
| | | | | 297/232 |
| 7,794,020 B2 * | 9/2010 | Dallos | ............... | B60N 2/682 |
| | | | | 297/440.15 |
| 8,616,653 B2 * | 12/2013 | Fukuda | ............... | B60N 2/68 |
| | | | | 297/452.2 |
| 9,139,120 B2 * | 9/2015 | Morimoto | ............... | B60N 2/68 |
| 10,569,680 B2 * | 2/2020 | Rasello | ............... | B60N 2/42 |
| 2005/0168041 A1 * | 8/2005 | Glance | ............... | B60N 2/68 |
| | | | | 297/452.18 |
| 2006/0273645 A1 * | 12/2006 | Ferrari | ............... | B60N 2/3011 |
| | | | | 297/336 |
| 2006/0273649 A1 * | 12/2006 | Saberan | ............... | B60N 2/68 |
| | | | | 297/452.18 |
| 2009/0167073 A1 * | 7/2009 | Fujieda | ............... | B60N 2/0705 |
| | | | | 297/452.18 |
| 2010/0264717 A1 | 10/2010 | Fukuda | | |
| 2015/0008716 A1 * | 1/2015 | Dry | ............... | B60N 2/68 |
| | | | | 297/452.18 |
| 2018/0037146 A1 * | 2/2018 | Line | ............... | B60N 2/682 |
| 2019/0047710 A1 * | 2/2019 | Bell | ............... | B60N 2/22 |
| 2019/0322199 A1 * | 10/2019 | Rasello | ............... | B60N 2/22 |
| 2021/0001756 A1 * | 1/2021 | Becker | ............... | B60N 2/0224 |

* cited by examiner

SEAT SUPPORT FRAME OF A MOTOR VEHICLE SEAT COMPRISING A SEAT FRAME AND AN INCLINATION-ADJUSTABLE SEAT SHELL

TECHNICAL FIELD

The disclosure relates to a seat support frame of a motor vehicle seat; the seat support frame has a seat frame, a seat shell supported by the seat frame and an adjusting device arranged between the seat shell and the seat frame, with which the inclination of the seat shell can be adjusted to the seat support frame. A leading edge of the seat shell is moved in the z-direction, i.e. up and down. This adjustment can be made manually or by motor.

BACKGROUND

From DE 10 2012 103 919 A1, a seat support frame of a motor vehicle seat is known; it consists of the following components: A seat frame is composed of a left-hand and a right-hand side part, a transverse tube connecting the two side parts to one another at the front, and a traverse that connects the two side parts to one another at the rear. A seat shell is supported by the seat frame; it has two joint regions at the rear, one of them is hinged to a side part respectively. The seat shell is composed of sheet metal parts two that are connected to one another and arranged at a distance from each other, namely an upper shell and a lower shell, and also comprises a load-bearing region in the form of a support tube, which runs parallel to the transverse tube. The upper shell and the lower shell together delimit a channel running parallel to the transverse tube. The support tube is housed in a channel space delimited by this channel. It protrudes at its two ends out of the channel that is open on the side. Each protruding end is connected to a support arm. An adjusting device is connected, on one side, to a front region of a side part and, on the other side, to the adjacent support arm. The distance of the seat shell is set relative to the transverse tube. The seat shell is supported at four points, namely via the two front support arms and across the two joint regions at the rear.

From DE 20 2017 105 365 U1, a seat support frame of a motor vehicle seat is known, which has a seat frame with a rotatably mounted transverse tube. The rotational movement of this transverse tube is achieved by an electric motor.

Two support arms are connected to the transverse tube, which are hinged at their free ends at the front regions of a seat shell. Here, the seat is also supported by a four-point support.

Reference is also made to US 2010/0264717 A1. The seat shell is supported by a front transverse element.

SUMMARY

The disclosure is intended to simplify the construction of a seat support frame. It should save space and weight.

From this point of view, the disclosure improves the seat support frame according to the above-mentioned DE 10 2012 103 919 A1 and to further develop it in such a way that the weight of the seat shell is reduced, installation space is saved and that the mechanics are simplified.

This task is achieved by means of a seat support frame of a motor vehicle seat
(a) with a seat frame comprising a left-hand and a right-hand side part, a transverse tube connecting the two side parts to one another at the front and a traverse that connects the two side parts to one another at the rear,
b) with a seat shell, which is supported by the seat frame, connected to the seat frame in two rear joint regions and composed of two sheet metal parts firmly connected to one another and are arranged at a distance from one another, namely an upper shell and a lower shell, wherein the upper shell and the lower shell together form a channel running parallel to the transverse tube, which delimits a channel space, and
c) with an adjusting device, which, on one side, is connected at a front region of one of the side parts and, on the other side, is connected in an articulated manner to the end region of the channel adjacent to said side part, and which allows the distance of the seat shell relative to the transverse tube to be adjusted.

In the case of this seat support frame, the seat shell is only carried and supported at three points, namely, at the two rear joint regions and only on one side at the front where the adjusting device is located. At the front, the other side is not supported. There is no support arm there. The seat shell is composed of upper shell and lower shell in such a way that it is torsionally stiff. It is so torsionally stiff that a fourth support point can be dispensed with.

The torsional stiffness is essentially achieved by means of the channel. It is dimensioned in such a way that it corresponds to the torsional strength of the support tube of DE 10 2012 103 919 A1. The task of the support tube is additionally assumed by the special design of the upper shell and the lower shell, i.e. their shape and connection.

The disclosure can also be described as follows: Seat support frame of a motor vehicle seat
  with a seat frame comprising a left-hand and a right-hand side part, a transverse tube connecting the two side parts to one another at the front and a traverse connecting the two sides at the rear,
  with a seat shell, which is supported by the seat frame, connected to the seat frame at a rear jointed region respectively, composed of two sheet metal parts that are connected to one another and are arranged at a distance to one another, namely and upper shell and a lower shell, and has a load-bearing region which runs parallel to the transverse tube, wherein the upper shell and the lower shell are rigidly connected to one another and together form a channel running parallel to the transverse tube, which delimits a channel space and forms the load-bearing region, and
  with an adjusting device which is connected, on one side, to a front region of the side part and, on the other side, to an end of a channel of the seat shell that is adjacent to this side part and allows the distance of the seat shell to be adjusted relative to the transverse tube.

In another alternative, the disclosure can be described as follows: seat support frame of a motor vehicle seat
  with a seat frame, which comprises a left-hand and a right-hand side part and a transverse tube connecting the two side parts to one another at the front,
  with a seat shell, which is supported by the seat frame, which is composed of two sheet metal parts firmly connected to one another and are arranged at a distance from one another, namely an upper shell and a lower shell, wherein the upper shell and the lower shell together form a channel running parallel to the transverse tube, which delimits a channel space, and
  with an adjusting device, which is connected, on one side, at a front region of the seat frame and, on the other side, articulately connected to the seat shell above it, preferably, the lower shell of the seat shell, and, in particular, one end of the channel, and allows the distance of the seat shell to be adjusted relative to the transverse tube.

The connection of the seat shell to the seat frame in the rear two joint regions can also be implemented by means of a continuous rear joint region or a plurality of rear joint regions. Another rear support of the seat shell is also possible. The disclosure does not relate to the support in the rear region of the seat shell, but only to the support in the front region. In general, the seat shell at the rear is articulately supported near each side part.

In contrast to most recent background art, the adjusting device does not engage on a support tube, but directly on the channel, which assumes the function of the support tube. Since the seat shell at the front is only supported in one place, space is created at the front, as it is not known from the most recent background art. This space can be used as storage space. Preferably, the seat shell in front is only vehicle supported on the outside.

Preferably, the upper shell is at least twice as large as the lower shell in terms of surface area. Preferably, the adjusting device is located in front of the transverse tube. Preferably, the upper shell is equipped with means for accommodating a cushion body.

Preferably, the seat shell is only supported by the adjusting device at its front region. Thus, the three-point support of the seat shell according to the disclosure is achieved by means of this.

Preferably, the seat shell is only supported by the seat frame at its front region on a single side; however, not on the other side. It is possible that the adjusting device is located in the middle between the two side parts.

The adjusting device can be articulately connected to the lower shell. It can be fixed to the seat frame or, as an alternative, connected to the seat frames at a joint.

In a preferred embodiment, a retaining part is welded at the end of the channel located above or next to the adjusting device, to which the adjusting device is hinged. It is possible to provide a spindle of the adjusting device with an eyelet at its free end and to articulately connect this eyelet directly to the channel, without arranging an additional part in between.

Preferably, the channel is closed on the side. Preferably, the upper shell and the lower shell are connected to one another in the edge regions of the channel, in particular, being welded. These connections are in the immediate vicinity of the channel space. Preferably, the channel space is closed on all sides. This can be achieved, in particular, by means of a closed seam circling around the channel space between the upper shell and the lower shell.

Preferably, the channel space is part of a U-shaped cavity, which has backward-pointing U-limbs, and the U-limbs run parallel to the side parts. The U-limb increases torsional stiffness when twisting around the y-axis. In addition, the seat shell becomes more flexible.

Preferably, in the channel space, the upper shell in the z-direction and in the x-direction each comprises a distance of at least 10 mm, preferably at least 20 mm from the lower shell. The torsional strength of the channel is achieved by means of a sufficient cross-sectional area, seen in the x-z plane.

Preferably, the upper shell and or the lower shell are configured with mirror-symmetry to an x-z plane, which runs through the longitudinal centre of the seat support frame. They can be used for a left as well as a right front seat.

The disclosure thus replaces a transverse support tube with a sheet metal construction, namely, in particular, the channel, which the upper shell and lower shell together delimit and form. This construction in flat sheet metal material is more cost-effective and lighter than using a tube known from the most recent background art. Despite lower wall thicknesses, a higher strength can be achieved than a tube offers due to the freely selectable distances between the upper shell and the lower shell, which can be selected to be as large as possible.

BRIEF DESCRIPTION OF THE DRAWINGS

Further advantages and features of the disclosure arise from the remaining claims as well as the description of a non-restrictive exemplary embodiment of the disclosure that now follows, which is explained in more detail with reference to the drawing below. The figures in this drawing show the following:

DETAILED DESCRIPTION OF THE DRAWINGS

Figure 1:
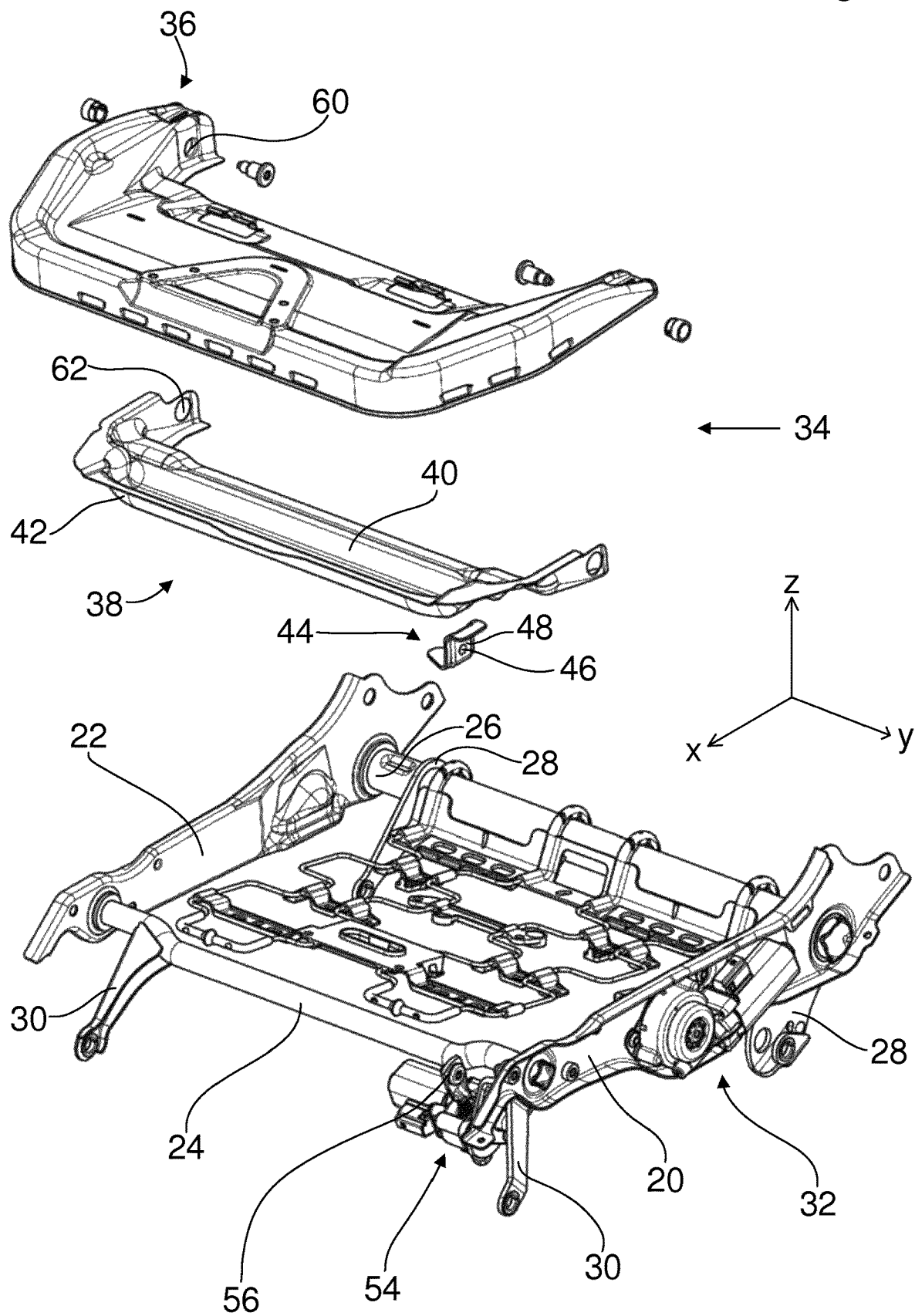
FIG. 1a perspective assembly diagram of a seat support frame.

The description uses a right-handed, orthogonal x-y-z coordinate system. The positive x-axis runs in the longitudinal direction of side parts, which is almost in line with the normal direction of travel of a motor vehicle. The positive y-axis is located in the plane of the seat support. The z-axis is essentially perpendicular upwards, this also corresponds to the designation "top". The word "front" is used for the positive x-direction. The word on the left is used for the positive y-direction.

A seat frame is essentially formed by a left side part 20, a right side part 22, a transverse tube 24, which connects the two side parts 20, 22 front, and a traverse 26, which connects the two side parts 20, 22 at the rear. Such a seat frame is state of the art. In the most recent background art, the seat frame is supported by a left-hand and a right-hand pair of guide rails (not shown here); they are well known. They are connected to the seat frame at the rear via a left and a right rear actuator arm 28 and in the front via a left and a right pivot support 30. The inclination of the rear actuator arms 28 is changed by an adjusting device 32, this is the most recent background art.

Figure 2:
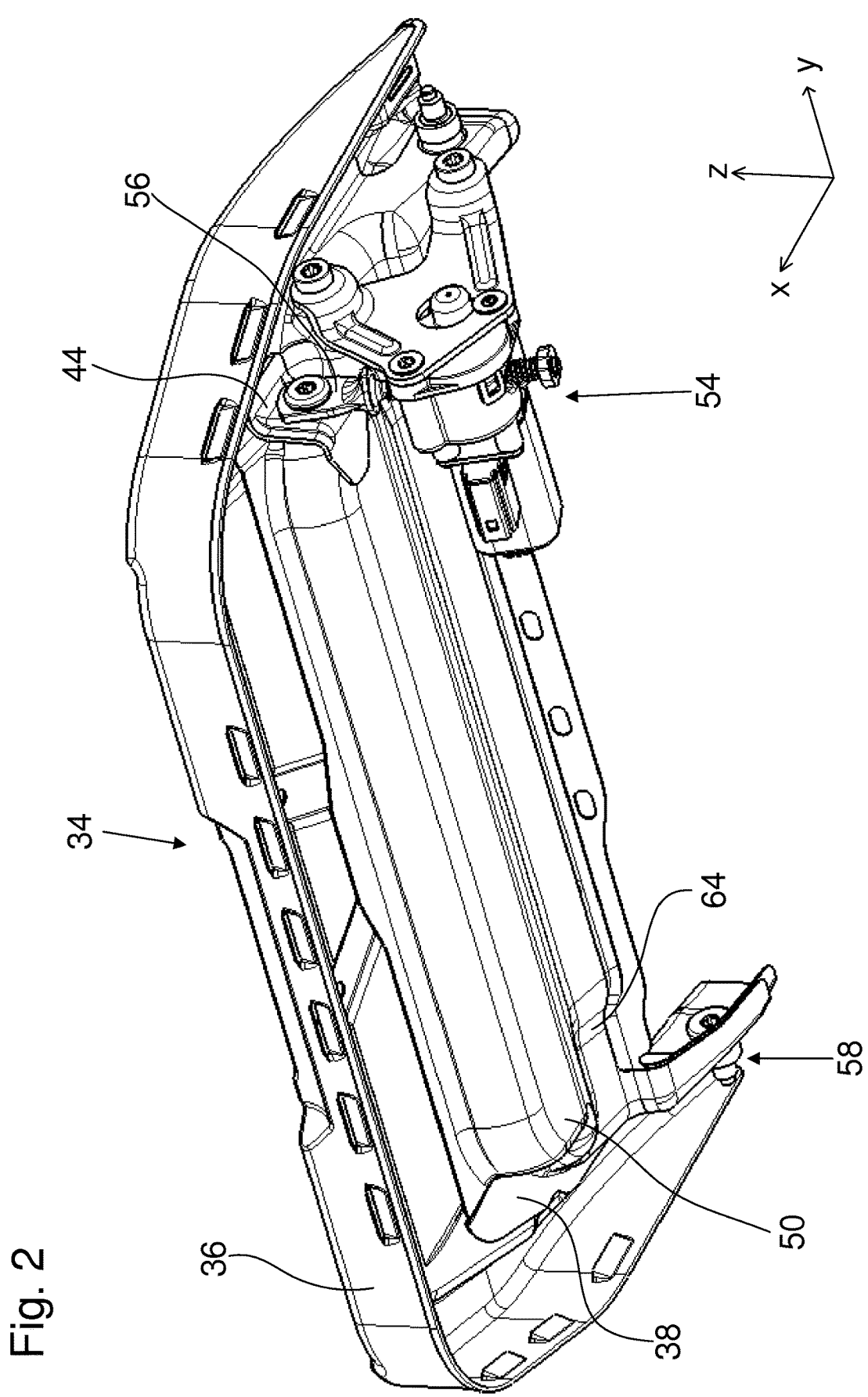
FIG. 2a perspective illustration of a seat shell with a view obliquely from the front, below and with an adjusting device, FIG. 3a perspective sectional view, section plane is the x-z plane and with view direction in the negative y-direction through the arrangement in accordance with FIG. 2, and FIG. 4a perspective section view like FIG. 3, but now in a positive y-direction as the direction of view.
Figure 3:
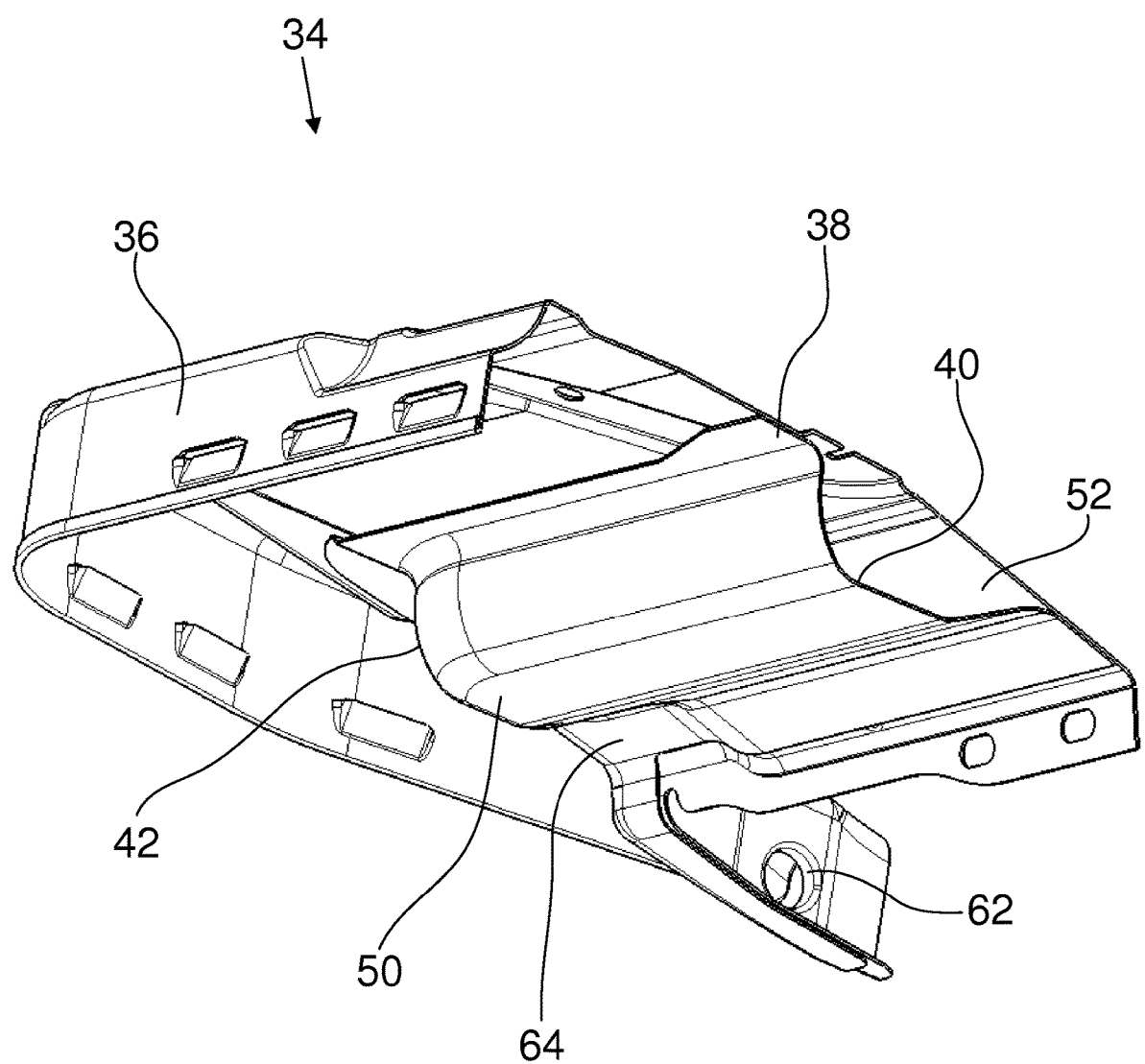
Figure 3:
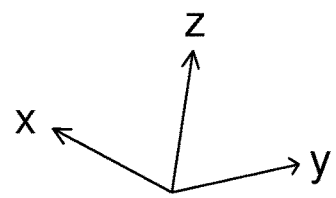
Figure 4:
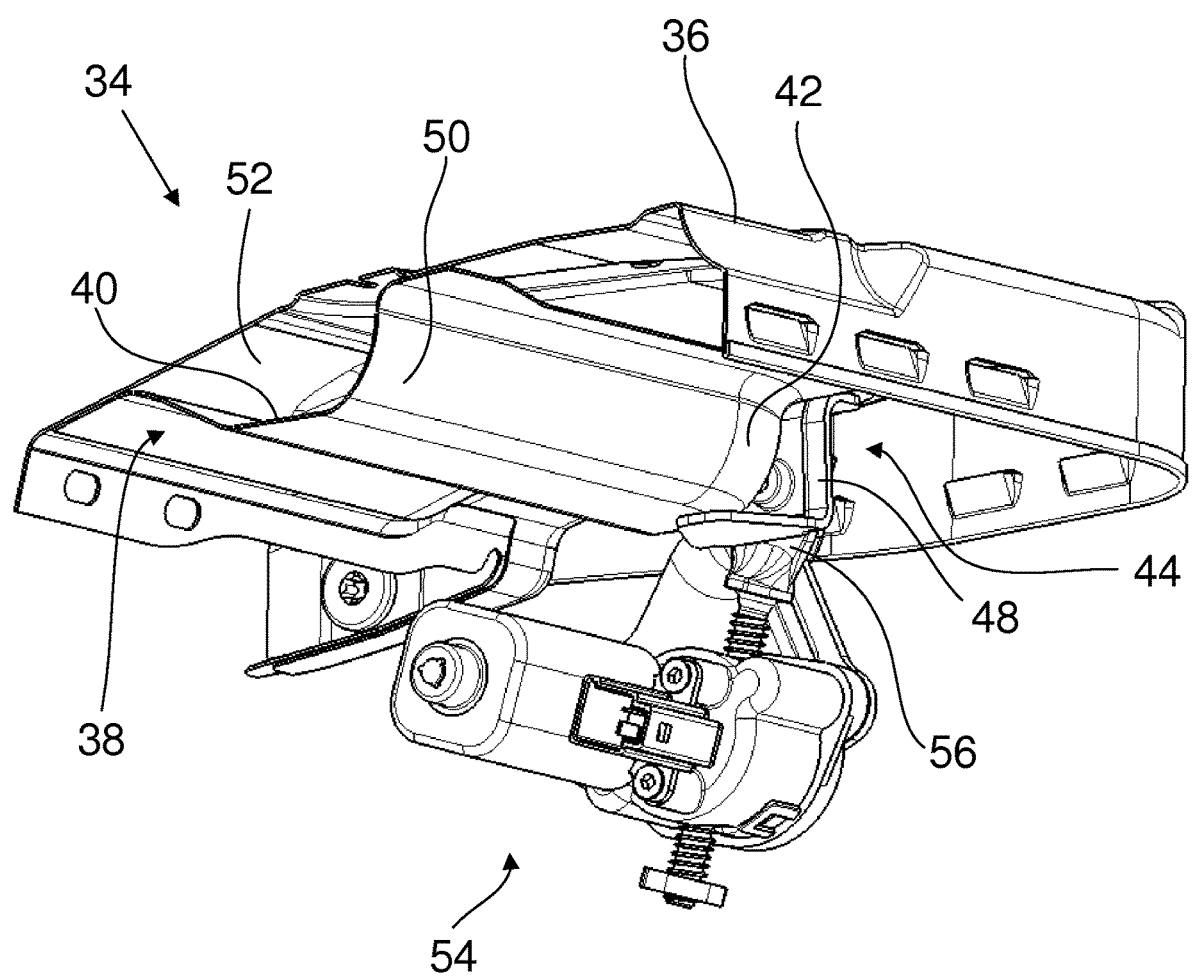

A seat shell 34 comprises an upper shell 36 and a lower shell 38. Both shells 36, 38 are sheet-metal forming parts. They can have a different material thickness, for example, 50% different from each other. A trough 40 is impressed into the lower shell 38, which extends across more than 60%, preferably more than 70% of the clear distance between the two side parts 20, 22. It runs in the y-direction. It is rounded or ball-shaped at its ends 42. At one end 42 and only at one end 42, in the exemplary embodiment at the left end 42, a retaining part 44 is welded. It has a bore hole 46 with a y-direction axis. The hole 46 is located in a middle region 48 of the retaining part 44, which runs in the x-z plane. From this middle region 48, at the top, an upper arm protrudes and below, a lower arm protrudes at a right angle, but away from each other in the opposing direction. The lower arm is welded at the deepest point of the trough 40, see FIGS. 2 and 4. The upper arm is welded at a small distance from the end 42 and thus from the trough 40 at the bottom of the lower shell 38.

The actual function of a seat shell 34 according to the most recent background art is assumed by the upper shell 36. It is accordingly designed with means for holding a seat cushion, upholster, etc. (not shown here). It is firmly connected to the lower shell 38. Preferably, a connecting seam is closed around the trough 40. The trough 40 forms a channel 50 together with the zone of the upper shell 36 located above it. It has an all-round closed channel space 52. Its cross-sectional area, seen in the y-direction, is chosen to be sufficiently large to achieve the necessary torsional stiffness for the three-point support. In the x-direction and in the z-direction, cross-sectional dimensions are achieved, which are preferably not less than 20 mm.

On the left side part 20 an adjusting device 54 is fixed in front of the transverse tube 24. It has an electric motor, it is designed according to the most recent background art. It has a support arm 56, the height of which is adjustable. It is connected to the hole 46 at a joint. The support of the seat shell 34 at its front region, i.e. above the transverse tube 24, is achieved by means of the support arm 56 and the described connection. This is the only support at the front. The right-hand side of the seat shell 34 is not supported in a similar way as in the most recent background art but keeps its position, even under load due to the sturdiness of the channel 50.

In a left-hand and a right-hand rear joint region, the seat shell 34 is hinged on the left-hand side part 20 or on the right-hand side part 22. This takes place according to the most recent background art. For forming the rear joint regions, the upper shell 36 has a left-hand and a right-hand passage 60 and the lower shell 38 has corresponding holes 62. On each side of the seat, there is a passage 60 near a hole 62, a passage 60 and a hole 62 are each aligned and belong to a joint region 58. Preferably, upper shell 36 and lower shell 38 are each connected in the region of a passage 60 and a hole 62. However, they can also be arranged at a distance from each other.

The lower shell 38 is seen in the z-direction about U-shaped. The base is formed by the trough 40. The holes 62 are located in the limbs respectively. There, the material of the lower shell 38 essentially runs on the x-z plane and contributes to the reinforcement of the seat shell 34. Furthermore, a formation 64 is provided in the limbs that has the same function as the larger trough 40 but runs perpendicularly to it. This also achieves reinforcement.

The disclosure relates to a seat support frame of a motor vehicle seat, said seat support frame having a seat frame which comprises a left-hand and a right-hand side part 20, 22, and a transverse tube 24 which connects the two side parts 20, 22 to one another at the front. Said seat support frame also has a seat shell 34, which is supported by the seat frame and is composed of two sheet metal parts which are firmly connected to one another and are arranged at a distance from one another, specifically an upper shell 36 and a lower shell 38. The upper shell 36 and the lower shell together form a channel 50 running parallel to the transverse tube 24. Said seat support frame has an adjusting device 54 which, on one side, is connected only at a front region of one of the side parts and, on the other side, is connected in an articulated manner to the end region of the channel 50 adjacent to said side part, and which allows the distance of the seat shell 34 relative to the transverse tube 24 to be adjusted.

Terms such as 'substantially', 'preferably' and 'the like', as well as possibly inaccurate specifications are to be understood in such a way that a deviation of plus/minus 5%, preferably plus/minus 2% and, in particular, plus/minus one percent from the normal value is possible.

The invention claimed is:

1. A seat support frame of a motor vehicle seat, the seat support frame comprising:
a seat frame with a left-hand side part and a right-hand side part and a transverse tube connecting the left-hand side part and the right-hand side part to one another at a respective front of the left-hand side part and the right-hand side part,
a seat shell, supported by the seat frame, is composed of two sheet metal parts firmly connected to one another and arranged at a distance from one another, an upper shell and a lower shell, wherein the upper shell and the lower shell together form a channel running parallel to the transverse tube, which delimits a channel space, and
an adjusting device, which, on a first side, is connected at a front region of one of the left-hand side part or the right-hand side part and, on a second side, is connected in an articulated manner to the end region of the channel adjacent to the side part to which the adjusting device is connected to on the first side, and which allows the distance of the seat shell relative to the transverse tube to be adjusted.

2. The seat support frame according to claim 1, wherein the seat shell has a front region and is only supported at the front region by the adjusting device.

3. The seat support frame according to claim 1, wherein the seat shell has a front region and is only supported on a first side at the front region by the seat frame and not on a second side.

4. The seat support frame according to claim 1, wherein the adjusting device is connected to the lower shell, to an end of a trough of the lower shell in an articulated manner.

5. The seat support frame according to claim 1, wherein at one end of the channel adjacent to the adjusting device, a retaining part is welded, to which the adjusting device is hinged.

6. The seat support frame according to claim 1, wherein the channel is closed on at least one of the sides.

7. The seat support frame according to claim 1, wherein the channel space is part of a U-shaped cavity, which has U-limbs that point towards a rear of the seat support frame, and that the U-limbs run parallel to the left-hand side part and the right-hand side part.

8. The seat support frame according to claim 1, wherein, in the channel space, the upper shell comprises a distance of at least 10 mm from the lower shell in a z-direction and in an x-direction respectively.

9. The seat support frame according to claim 1, wherein, for a formation of two rear joint regions, the upper shell comprises two passages and the lower shell comprises two holes, that, on each side of the seat, a passage is located near a hole respectively, and that a passage and a hole each belong to a joint region.

10. The seat support frame according to claim 1, wherein the transverse tube is rotatably mounted in each of the left-hand side part and the right-hand side part, that the transverse tube is firmly connected with a left pivot support and to a right pivot support.

11. The seat support frame according to claim 1, wherein the upper shell and/or the lower shell are configured with mirror-symmetry to x-z plane that runs through a longitudinal centre of the seat support frame.

12. The seat support frame according to claim 1, wherein a traverse, which connects the left-hand side part and the right-hand side part to one another at a rear of each of the left-hand side part and the right-hand side part, is connected in a swivel joint.

13. The seat support frame according to claim 1, wherein the traverse is connected near a first end region with a left actuator arm and near a second end region with a right actuator arm.

14. The seat support frame according to claim 1, wherein the lower shell has a trough which runs over at least 60% of a clear distance between the left-hand side part and the right-hand side part.

* * * * *